United States Patent [19]

Fasano

[11] Patent Number: 4,567,639

[45] Date of Patent: Feb. 4, 1986

[54] WIRE INSTALLATION AND CUTTING TOOL

[75] Inventor: Michael Fasano, Syosset, N.Y.

[73] Assignee: Porta Systems Corp., Syosset, N.Y.

[21] Appl. No.: 646,596

[22] Filed: Aug. 31, 1984

[51] Int. Cl.[4] .................................. B23P 23/00

[52] U.S. Cl. .................................. 29/566.4; 29/751; 29/861; 30/246

[58] Field of Search .................... 29/566.3, 566.4, 861, 29/866, 751, 758; 30/246, 261

[56] References Cited

FOREIGN PATENT DOCUMENTS 2075903 11/1981 United Kingdom ............... 29/566.4

*Primary Examiner*—Douglas D. Watts

*Attorney, Agent, or Firm*—Charles E. Temko

[57] ABSTRACT

An improved combination wire installation and cutting tool for installing the ends of telephone circuit conductors into known quick clip connectors, following which the stubs on the free ends of the conductors are cut to predetermined lengths, so as not to interfere with adjacent conductors. As contrasted with prior art devices of this type, the tool does not require the free ends of the conductors to be inserted into holes in the tool, and the tool has a cutting element which can sever the stubs on the conductors before the conductors are fully seated in the quick clip connectors.

2 Claims, 11 Drawing Figures

WIRE INSTALLATION AND CUTTING TOOL

CROSS-REFERENCE TO RELATED APPLICATION

Reference is made to the co-pending application of Michael Fasano, Ser. No. 565,112, filed Dec. 28, 1983, which application discloses and claims a related invention.

BACKGROUND OF THE INVENTION

This invention relates generally to the field of telephony, and more particularly to an improved tool for inserting the free ends of wire conductors into resilient type terminals or connectors normally mounted upon connector blocks supported upon telephone office main frames.

The use of so-called quick clip connectors has increased dramatically over the last decade because of considerations of cost and ease of installation. Connectors of this type normally consist of a flat metallic stamping having a plurality of resiliently expandable open ended slots at one end thereof, the opposite end being imbedded in the connector block for connection thereto by a wire wrap operation which may be made at the time of manufacture of the block. The slots are often configured so that, upon insertion of the free ends of insulated conductors, the insulation is cut and removed from the conductors only in the area of contact with the connectors, thus avoiding the necessity of a separate wire stripping operation. It is known in the art to provide a tool for effecting such insertions of the free ends of conductors into slots of quick clip connectors. However, once the free end of a conductor is inserted and seated in a slot, it is difficult to trim the exposed stub on the free end of the conductor to a predetermined length, so that it will not interfere with other adjacently located conductors. Further, should it be necessary for any reason to remove the seated conductor from the slot, this usually has been accomplished by pulling the conductor itself with substantial force to overcome the frictional engagement with the opposed sides of the slot, it being difficult to spread the slot for this purpose in the absence of an appropriate tool.

In the above-mentioned co-pending application, there is disclosed a wire installation tool of the type referred to, in which provision has been made not only for forcing the free end of a conductor into a slot in a quick clip connector, but also for thereafter cutting the exposed stub of the conductor to a standardized length where it protrudes from the slot. Provision has also been made at an opposite end of the tool for engagement of the protruding stub and further spreading of the slot to provide convenient disengagement and removal of an unwanted conductor, without damage to either the conductor or the quick clip connector.

While not without substantial utility, this tool construction has several accompanying disadvantages. One is the necessity for inserting the free end of the conductor into a corresponding opening in the tool before installing the conductor, which is an inconvenience. Another disadvantage is that the exposed stub of the conductor is cut by the tool only after the conductor is fully seated in a slot in a quick clip connector which can make it more difficult to cleanly cut the stub. Still another disadvantage is that the tool cannot simultaneously insert two conductors, having their free ends extending in diametrically opposite directions, into the slots of a pair of adjacent quick clip connectors.

SUMMARY OF THE INVENTION

Briefly stated, the present invention contemplates the provision of an improved tool of the type described in which the above-mentioned disadvantages have been substantially eliminated. In lieu of providing a wire insertion element having a slidably mounted flat blade member with a hole into which the free end of a conductor is inserted, the wire insertion element of this invention is provided with a conductor accommodating groove. The free end of a conductor need only be aligned with the conductor accommodating groove of this invention so that the groove can be used to push the free end of the conductor into the slot of a quick clip connector. A cutting element, pivotally mounted about the conductor accommodating groove, can begin to sever the stub of the conductor under the action of a cam before the conductor is fully seated in the slot. When the stub of the conductor has been severed and the tool removed from the quick clip connector, a spring returns the cutting element to its original position automatically. With the tool of this invention provided with a pair of conductor accommodating grooves and a cutting element about each groove, the free ends of a pair of conductors, extending in diametrically opposite directions, can be simultaneously inserted into the slots of a pair of adjacent connectors.

Provision is also made at an opposite end of the tool for engaging the free end of an installed conductor to provide convenient disengagement and removal thereof without damage to either the conductor or the quick clip connector, to be disengaged. With the present tool construction, a pair of conductors may be simultaneously removed in a single operation.

BRIEF DESCRIPTION OF THE DRAWINGS

In the drawings, to which reference will be made in the specification, similar reference characters have been employed to designate corresponding parts throughout the several views.

DETAILED DESCRIPTION OF THE PREFERRED EMBODIMENT

Figures 1, 2, 3:
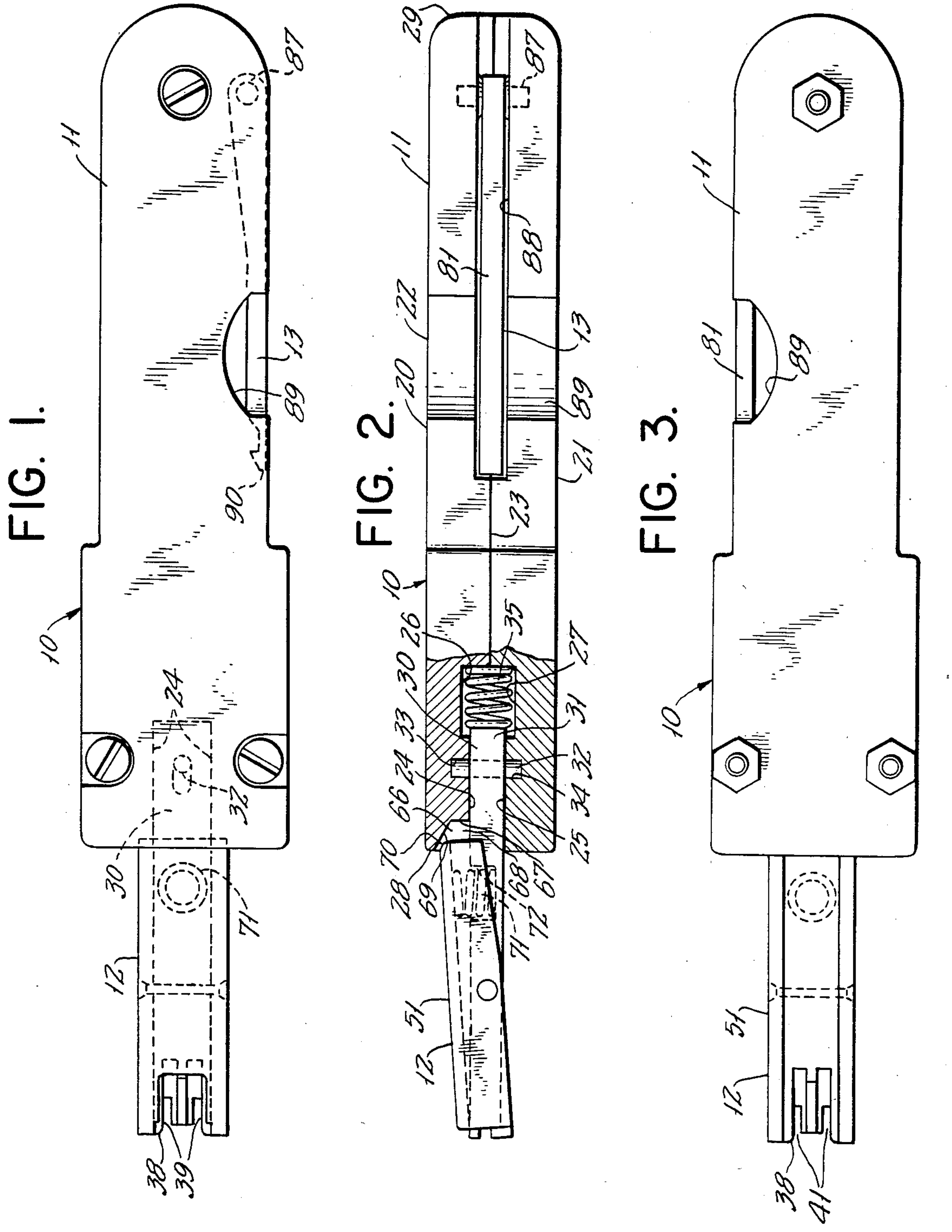
FIG. 1 is a top plan view of an embodiment of the tool of the invention.
FIG. 2 is a side elevational view thereof, partly in section.
FIG. 3 is a bottom plan view thereof.
Figure 5:
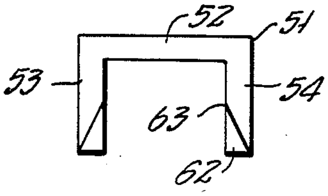
FIG. 5 is an end elevational view of the cutting member as seen from the left end portion of FIG. 4.
Figure 4:
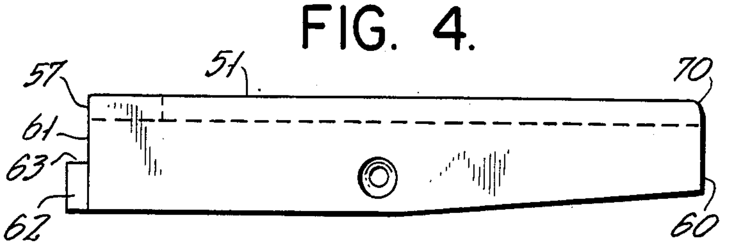
FIG. 4 is a side elevational view of a cutting member forming a part of the disclosed embodiment.
Figure 6:
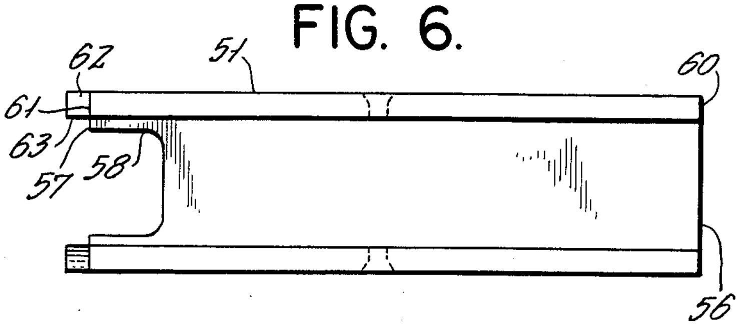
FIG. 6 is a bottom plan view of the cutting member.
Figure 7:
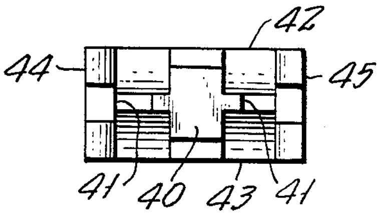
FIG. 7 is an end elevational view of a main body forming a part of the disclosed embodiment as seen from the left end portion of FIGS. 1-3.
Figure 8:
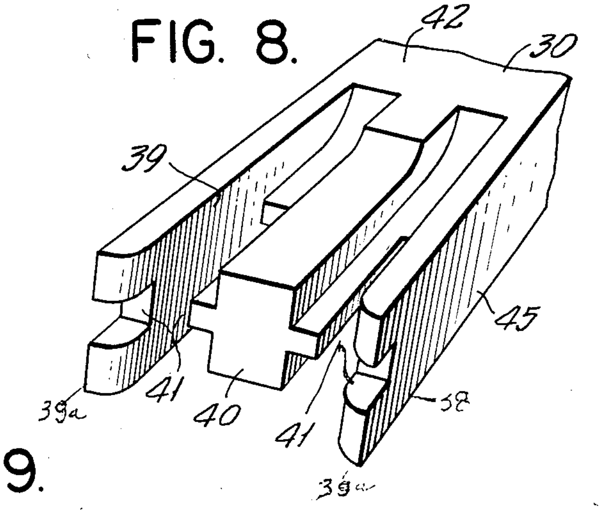
FIG. 8 is a perspective view of a portion of the main body as seen from the left end portion of FIGS. 1-3.
Figure 9:
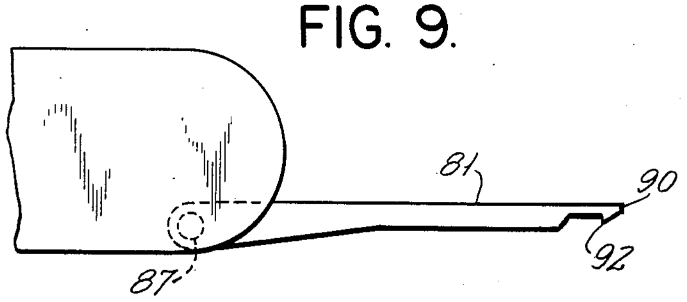
FIG. 9 is a side elevational view of a wire removal element forming a part of the disclosed embodiment.
Figure 10:
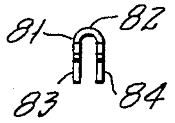
FIG. 10 is an end elevational view of the wire removal element as seen from the left end portion of FIG. 9.
Figure 11:
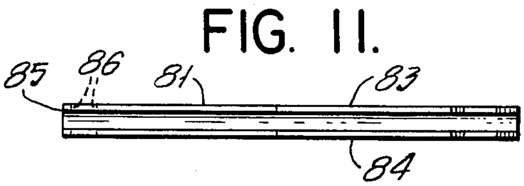
FIG. 11 is a bottom plan view of the wire removal element.

In accordance with this invention, a wire installation and cutting tool, generally 10, comprises broadly a handle element 11, a wire insertion element 12, and a wire removal element 13 as shown in FIGS. 1-11.

The handle element 11 is most conveniently formed of rigid metal or plastic to include upper and lower elongated handle members 20 and 21, respectively, each being bounded by an outer rounded surface 22 and an inner generally planar surface 23. The inner surfaces 23 form longitudinally extending wire insertion element-retaining channels 24 and 25 communicating with longitudinally extending spring-retaining channels 26 and 27. The channels 24 and 25 extend between a first end surface 28 and a second end surface 29 which may be of generally rounded configuration.

The wire insertion element 12 is preferably made of tempered steel and includes an elongate main body of U-shaped cross-section 30 having an inner end 31 slidably positioned with the channels 24 and 25. A pin 32, disposed in bores 33 and 34 perpendicular to channels 24 and 25, extends through a longitudinally extending slot 35 in the inner end 31 of body 30 to retain the inner end 31 within channels 24 and 25. This mounting permits limited longitudinal movement of the main body 30 between first and second positions relative to the handle element 11, with a spring 36 within channels 26 and 27 urging the body 30 to the first or outer position shown in FIGS. 1-3, inclusive.

The trifurcated outer end 38 of the main body 30 (see FIGS. 1, 3, 7 and 8) has a pair of longitudinally extending prongs 39 on its opposite lateral sides and a central longitudinally extending projection 40 between the prongs 39. The outer end edge **39*a* of each prong 39 has a central conductor accommodating groove 41 extending laterally across the entire prong 39. Each groove 41 is adapted to engage the laterally extending free end of a conductor (not shown) and, together with the projection 40, to urge the free end of the conductor into a slot of a standard quick clip connector (not shown). The outer end 38 of the main body 30 is bounded by an upper surface 42, a lower surface 43 and parallel side surfaces 44 and 45** which form a generally rectangular cross section.

Partially surrounding the outer end 38 of the main body 30 is a cutting member 51 (see FIGS. 2-6), preferably made of tempered steel. The cutting member 51 includes an upper wall 52 and parallel side walls 53 and 54 on its opposite lateral sides. The side walls 53 and 54 of the cutting member 51 are pivotally connected to, and closely mounted about, the side surfaces 44 and 45 of the main body 30, whereby the cutting member 51 can pivot about the body 30 between a first position in which the two are substantially parallel and a second position in which the two are at an acute angle relative to one another. The upper wall 52 is bounded by an inner end edge 56 and an outer end edge 57, the latter having a cut out portion 58 which overlies the central projection 40 in the outer end 38 of the body 30. The side walls 53 and 54 of the cutting member 51 are similar, each being bounded by an inner end edge 60 and an outer end edge 61. Each outer end edge 61 of a side wall 53 or 54 has mounted thereon a beveled cutting member 62 having a cutting edge 63 at the top thereof that is located along the inside surface of the side wall. Each cutting edge 63 is located on the cutting member 51: (1) so that the cutting edge 63 is beneath and substantially parallel to the bottom edge of a groove 41 in the adjacent side surface 44 or 45 of the body 30 when the body is in its first or outer position shown in FIGS. 1-3 and the cutting member 51 is at an acute angle to the body 30 as shown in FIG. 2; and (2) so that the cutting edge 63 is above the top edge of the groove 41 in the adjacent side surface 44 or 45 when the body 30 is in its second or inner position and the cutting member 51 is substantially parallel to the body 30.

Referring to FIG. 2, the upper handle member 20 at the inner end thereof forms a shaped recess 66 including a bottom surface 67, side surfaces, one of which is indicated by reference numeral 68, and an inclined surface 69 forming a cam. The upper wall 52 of the cutting member 51 is provided with a corresponding rounded follower surface 70. A short spring 71 is disposed within a bore 72 in the main body 30, perpendicular to the channels 24 and 25 in the handle element 11. The spring 71 urges the cutting member 51 to the position shown in FIG. 2, wherein the cutting member is at an acute angle to the main body 30, when the body 30 is extended to its first, leftwardmost position as seen in FIG. 2.

In use of tool 10, the free end of a conductor (not shown) can be initially aligned with one of the grooves 41 in the outer end 38 of the main body of the wire insertion element 12 and positioned at the open end of a slot in a quick clip connector such as is disclosed in the above-mentioned co-pending application. In this regard, the conductor can be one of a pair of conductors, the free ends of which extend in diametrically opposite directions, and the connector can be one of a pair of adjacent connectors, whereby the pair of conductors will be simultaneously installed in the connectors in accordance with this invention. Manual pressure, exerted longitudinally upon the handle element 11 against the free end of the conductor and the open end of the slot of the connector, will then cause the free end of the conductor to be held within one of the grooves 41 while the groove urges the free end of the conductor to move into the slot where the slot strips insulation from the conductor as the slot engages the conductor in a known manner. As such pressure on the handle element 11 urges the conductor into the slot, the main body 30 will be urged to move longitudinally inwardly of the handle element 11 against the action of the spring 36. As this movement continues, the follower surface 70 will contact the cam surface 69 and be cammed downwardly from its position in FIG. 2, causing pivoting movement of the cutter member 51 from an acute angled relationship toward a substantially parallel relationship with respect to the main body 30. As this pivoting movement occurs, each cutting edge 63 of the cutting member 51 will move upwardly and across the end of one of the grooves 41 in one of the side surface 44 or 45 of the body 30, thereby at least partially severing in cooperation with the one side surfaces 44 or 45 the stub on the free end of the conductor extending laterally outward of the groove 41. When the conductor has been urged inwardly of the slot of the connector a predetermined distance whereby the conductor is completely seated, the cut out portion 58 of the upper wall 52 of the cutting member 51 will contact a reference surface on the connector, so that all further such pressure on the handle element 11 will cause longitudinal movement of the main body 30 inwardly of the handle element 11 and resulting pivotal movement of the cutting member 51 to complete the severing of the stub on the conductor held in the groove 41. In this regard, the longitudinal movement of the main body 30 inwardly of the handle element 11 will be governed by the pin 32 and slot 35 which are designed to permit sufficient longitudinal movement of the body to effect a complete severing of the conductor stub.

Referring to FIGS. 1, 2, 9, 10 and 11, the wire removal element 13 includes a pivotally mounted hook member 81 which can be formed as a single stamping and subsequently bent to U-shaped configuration to include a base wall 82 and a pair of parallel side walls 83 and 84. The hook member 81 includes a first end 85 having aligned bores 86 permitting the pivotal mounting of the hook member 81 within the handle element 11 by a pintle 87. The handle element 11 includes a longitudinal groove 88 to enclose the hook member 81 when not in use and a transverse groove 89 to permit ready access to the free end 90 of the hook member 81 to pivot it to operative position when required. The free end 90 of the hook member 81 is provided with a pair of parallel hook-like extensions 92, spaced apart a distance corresponding to that of a pair of conductors seated in adjacent slots of one or a pair of quick clip connectors. Each extension 92 can engage the end of one conductor seated within a slot in a quick clip connector, and the pair of extensions 92 can be used to simultaneously engage and remove the seated ends of a pair of conductors in slots in one or a pair of quick clip connectors.

It is to be understood that the invention in the above-described tool is not limited to the precise details of structure shown and set forth in this specification, and obvious modifications will occur to those skilled in the art to which the invention pertains.

I claim:

1. An improved tool for the rapid installation of a pair of wire conductors into the expandable slots of a quick clip connector comprising: a manually engageable handle element having a first end thereon, and a wire insertion element on said first end; said wire insertion element including an elongate main body; said handle element having a longitudinally disposed channel therein; said elongate main body being slidably mounted within said channel for longitudinal movement between first and second positions; first resilient means urging said main body to said first position; and an elongate cutting member of U-shaped cross-section and at least partially surrouding said main body, and being connected to said main body for limited pivotal movement between a first position in which said cutting member lies substantially parallel to said main body and a second position in which said cutting member is disposed at an angle relative to said main body; second resilient means urging said cutting member to said second position; and cooperating cam and follower means on said cutting member and said handle element for urging said cutting member to said first position as said main body moves to its second position against the action of said first resilient means; said main body having laterally extending plural groove means therein for engaging the pair of conductors and for urging the same into engagement with the connector; said cutting member having plural cutting edges thereon one on each side of said main body and movable past said plural groove means as said cutting member pivots from its second position to its first position to sever the stubs of the conductors disposed in said plural groove means.

2. The tool means as set forth in claim 1, in which said first resilient means is located in said handle element and said second resilient means is located between said cutting member and said main body.

* * * * *